United States Patent [19]

Kosarzecki

[11] Patent Number: 4,531,536

[45] Date of Patent: Jul. 30, 1985

[54] FLOW DIVIDER-COMBINER VALVE

[75] Inventor: Constantine Kosarzecki, Inverness, Ill.

[73] Assignee: Modular Controls Corporation, Villa Park, Ill.

[21] Appl. No.: 647,915

[22] Filed: Sep. 6, 1984

Related U.S. Application Data

[63] Continuation of Ser. No. 404,131, Aug. 2, 1982, abandoned.

[51] Int. Cl.$^3$ .............................................. G05D 11/03

[52] U.S. Cl. ...................................... 137/111; 137/118

[58] Field of Search .............. 137/118, 625.66, 625.69, 137/111

[56] References Cited

U.S. PATENT DOCUMENTS

| | | | |
|---|---|---|---|
| 3,570,516 | 3/1971 | Mason | 137/625.66 |
| 3,625,254 | 12/1971 | Rice | 137/625.66 |
| 4,121,601 | 10/1978 | Presley | 137/118 |
| 4,265,273 | 5/1981 | Peterson | 137/625.69 |
| 4,319,609 | 3/1982 | Debrus | 137/625.66 |

OTHER PUBLICATIONS

Flow Divider-Combiner Valve Shown in Drawing Number FDC1-16-X-XX.

*Primary Examiner*—Martin P. Schwadron
*Assistant Examiner*—James R. Shay
*Attorney, Agent, or Firm*—Trexler, Bushnell & Wolters, Ltd.

[57] ABSTRACT

A novel flow divider-combiner valve unit is disclosed. A valve body includes fluid passageway means for controlling fluid flow through the divider-combiner valve unit. The fluid passageway means comprises: a cavity, first, second and third passageways; first and second pressure-responsive elements; and biasing elements for retaining the pressure-responsive elements substantially in open positions until a predetermined substantial pressure differential exists in the divider-combiner valve unit. The biasing elements also enable the pressure-responsive elements to move substantially independently of each other toward closed positions when a first pressure differential in the divider-combiner valve unit exceeds the predetermined pressure differential. The biasing elements additionally cause the pressure-responsive elements to move substantially in unison when a second pressure differential in the divider-combiner valve unit exceeds the predetermined pressure differential. The first and second passageways communicate with first and second spaced portions of the cavity. The third passageway communicates with an intermediate portion of the cavity. The first and the second pressure-responsive elements are movable in the cavity respectively between first open positions and progressively closed positions. The fluid passageway means controls fluid flow through the divider-combiner valve unit by controlling fluid flow between the first and the second cavity portions and the first and the second passageways.

6 Claims, 6 Drawing Figures

FLOW DIVIDER-COMBINER VALVE

This application is a continuation of application Ser. No. 404,131, filed Aug. 2, 1982, now abandoned.

BACKGROUND OF THE INVENTION

This invention is directed to a novel flow control valve, and more particularly, is directed to a novel flow divider-combiner valve.

A flow divider-combiner valve is generally designed for use with a system which uses a pressurized hydraulic fluid to drive at least two hydraulic cylinders, motors, or the like, one such being driven independently of the other. Such a valve functions as a flow divider when a single stream of hydraulic fluid, from a hydraulic fluid source, flows through the valve and thereby is divided into at least two hydraulic fluid streams. When flow of hydraulic fluid through such a valve is reversed, the valve functions as a flow combiner to combine several such hydraulic fluid streams.

For example, such a flow divider-combiner valve is often used in combination with a wheeled vehicle having at least two independently driven wheels. Each wheel of the vehicle is generally driven by a respective hydraulic motor. Each hydraulic motor is generally connected to the combiner side of such a valve as well as to the divider side. Independent connections between the flow-divider side of the valve and the respective hydraulic motors are made in a manner such that the flow divider-combiner valve supplies each hydraulic motor, independently, with hydraulic fluid. In addition, independent connections between the flow-combiner side of the valve and the respective motors are made in a manner such that the divider-combiner valve receives at least two independent streams or flows of hydraulic fluid from the separate hydraulic motors. Thus, the flow divider-combiner valve either independently supplies hydraulic fluid to or independently receives hydraulic fluid from each such hydraulic motor.

For such a wheeled vehicle, flow of hydraulic fluid through the valve causes each of the driven wheels to rotate at about the same speed and in the same direction. When flow of fluid is reversed through the valve, rotation of the wheels is similarly reversed. Thus, when equipped with a flow-combiner valve, the wheeled vehicle does not require a conventional transmission.

It is desirable that the divider-combiner valve cause the wheels to rotate at about the same speed so that the wheeled vehicle moves in a linear and predictable fashion.

Commercially available divider-combiner valves generally independently control flow of hydraulic fluid to each hydraulic motor by being responsive to pressures within and thereby accordingly adjusting or regulating the flows within the connections, lines or conduits supplying hydraulic fluid to or receiving hydraulic fluid from the hydraulic motors. A problem is encountered when using such commercially available divider-combiner valves, however, when one motor is subjected to a no-load condition (such as when its respective wheel is on ice) or when the vehicle is turning. Most of the commercially available divider-combiner valves react to such situations in two ways. First, as to the no-load condition, conventional divider-combiner valves generally respond to such a condition by reducing flow of hydraulic fluid through the no-load motor and by reducing flow through the other motor as well, resulting in the slowing down or stopping of the vehicle. Second, when the vehicle is directed around a corner, the wheel tranversing the greater arc causes its respective motor to act as a pump, in contrast to the motor guiding the vehicle through the turn. The motor which acts as a pump causes a low resistance to flow to be sensed at the conventional divider-combiner valve connected thereto. The divider-combiner valve responds by reducing the flow of hydraulic fluid to the motor guiding the vehicle through the turn. In addition, when the wheeled vehicle is directed around a corner, the wheel traversing the greater arc sometimes locks up, and upon being dragged across the ground by the wheel traversing the lesser arc, generally generates skid marks upon the ground, rug or such support surface.

OBJECTS AND SUMMARY OF THE INVENTION

Accordingly, it is a general object of this invention to provide a novel divider-combiner valve.

A more specific object is to provide such a valve which, when used with an apparatus such as a wheeled vehicle, does not react to cause such a vehicle to stop when one wheel of the vehicle is subjected to a no-load condition.

A related object is to provide such a valve which, when used with such a vehicle, is adapted to substantially avoid a wheel lock-up condition which otherwise might occur when such a vehicle is directed around a corner.

Briefly, and in accordance with the foregoing objects, a flow divider-combiner valve unit will now be summarized. Such a unit comprises a valve body having fluid passageway means for controlling fluid flow through the divider-combiner valve. The fluid passageway means comprises a cavity, first and second passageways communicating with first and second spaced portions of the cavity and a third passageway communicating with an intermediate portion of the cavity. First and second pressure-responsive elements, disposed within the cavity, are longitudinally movable in the cavity between respective substantially open positions and progressively closed positions. Movement of the pressure-responsive elements within the cavity initially controls fluid flow between the first and the second spaced portions of the cavity and ultimately controls, individually, fluid flow through the first and second passageways.

Means are provided for retaining the pressure-responsive elements, individually, in the substantially open positions until there is at least a predetermined substantial pressure difference between fluid pressures in the intermediate cavity portion and either of the first or the second portions of the cavity. The pressure-responsive elements are adapted to move substantially independently of each other towards the closed positions when a pressure differential between the intermediate portion of the cavity and at least one of either of the first or the second portion of the cavity exceeds the predetermined pressure differential. The structure also includes means for causing the pressure-responsive elements to move substantially in unison either when the pressure differential between the intermediate cavity portion and both the first cavity portion and the pressure differential between the intermediate cavity portion and the second cavity portion, individually, exceeds the predetermined pressure differential or when fluid pressure in the first and the second spaced portions of the cavity or in the intermediate portion of the cavity causes the first pressure-responsive flow element to biasly engage the second pressure-responsive flow element.

BRIEF DESCRIPTION OF THE DRAWINGS

The foregoing, as well as other objects, features and advantages of the invention will become more readily understood upon reading the following detailed description of the illustrated embodiment, together with reference to the drawings, wherein.

DETAILED DESCRIPTION OF THE ILLUSTRATED EMBODIMENT

Figure 1:
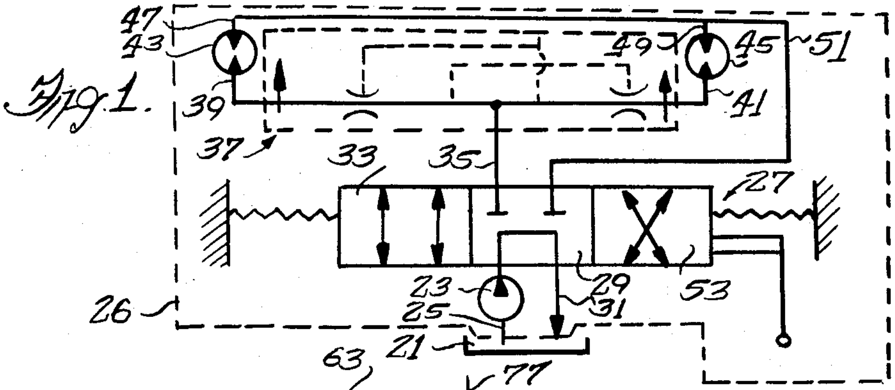
FIG. 1 is a schematic of a hydraulic circuit incorporatint the divider-combiner valve of the invention.

Referring to the drawings and initially to FIG. 1, the novel divider-combiner valve will now be discussed as it is used in combination with a typical hydraulic circuit. The hydraulic circuit includes a fluid source 21, and a pump 23 for drawing the hydraulic fluid from the source 21 (via a conduit 25) and for pumping the fluid forward through a system or hydraulic circuit 26. Flow of hydraulic fluid through the circuit 26 can be accomplished in any one of at least three different ways.

A well-known schematic representation for a conventional, biased, three-position solenoid valve, referred to generally by the reference numeral 27, presents a first position 29 which permits or causes the hydraulic fluid to bypass much of the hydraulic circuit 26 and to be directed back to the fluid source 21 via a conduit 31.

A second position 33 of the solenoid valve 27 permits or causes hydraulic fluid to be directed forward in the hydraulic circuit 26 via a conduit 35 and into the flow divider-combiner valve, referred to generally by the reference numeral 37. With the solenoid valve 27 in the second position 33, the flow divider-combiner valve 37 functions as a flow divider, hydraulic fluid being directed through individual conduits 39, 41 to individual, respective hydraulic motors 43, 45. Each hydraulic motor 43, 45 is directly coupled to and is used to drive a respective wheel (wheels not shown).

Hydraulic fluid individually exits each hydraulic motor 43, 45 via a respective conduit 47, 49. The hydraulic fluid exiting the motors 43, 45 is combined in a manifold 51 and conveyed forward within the manifold 51, through the conduit 31 and ultimately, is conveyed through the conduit 31 back into the source 21 to complete the flow of hydraulic fluid through the circuit 26.

When the solenoid valve 27 is set at a third position 53, flow of hydraulic fluid through much of the divider-combiner valve 37 and hydraulic motor portions of the hydraulic circuit 26 is reversed and the flow divider-combiner valve 37 functions as a flow combiner: whereby hydraulic fluid, which is flowing out of the divider-combiner valve 37, is directed via the conduit 35, through the conduit 31, and back into the fluid source 21.

Figure 2:
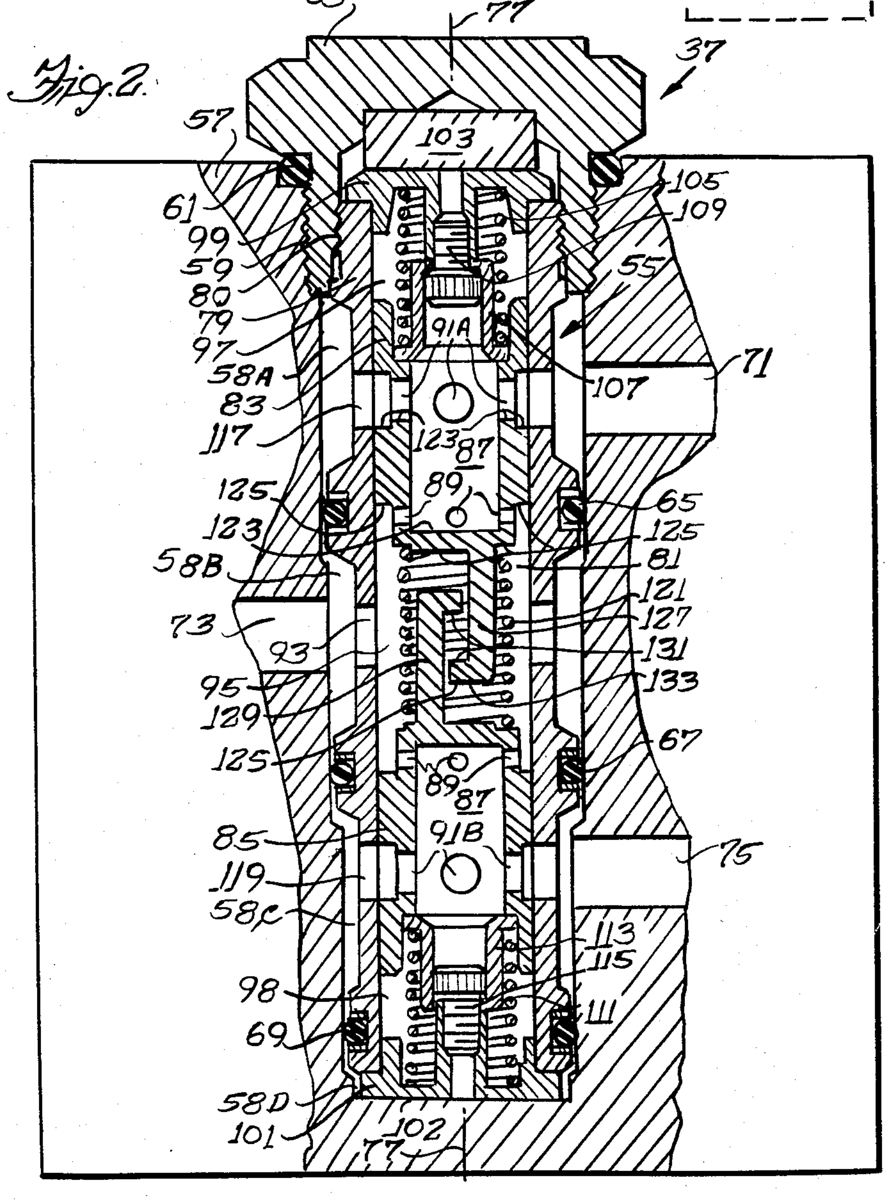
FIG. 2 is a side view, partially in section, of a preferred embodiment of the flow divider-combiner valve in accordance with the invention, respectively presenting open positions between first and second spaced portions of the cavity and first and second passageways through the valve body.

Referring to FIG. 2, it will be seen that the preferred embodiment of the flow divider-combiner valve 37 of the present invention is generally cylindrical in shape and adapted to be disposed within a cavity (referred to generally by the reference numeral 55) of a valve body 57. The cavity 55 comprises a series of individual steps 58A, 58B, 58C and 58D, all of which are concentric with each other. The diameters of the steps 58A, 58B, 58C and 58D progressively decrease moving inwardly into the cavity 55.

The divider-combiner valve structure presented in FIGS. 2–6 includes external circumferential threads 59 near the opening or mouth of the cavity 55 so that the divider-combiner valve 37 can be screwed into mated threads which have been cut or otherwise formed in the valve body 57.

A first O-ring 61, located near the outer or exterior surface of the valve body 57 and circumferentially mounted at the opening or mouth of the cavity 55, is urged against the threads 59 (at the junction of the divider-combiner valve 37 and the valve body 57) by a portion of a valve cap or retainer 63 in a manner such that the first O-ring 61 seats and thereby seals the divider-combiner valve 37 into the cavity 55.

A second O-ring 65, circumferentially carried by the divider-combiner valve 37, seats against a circumferential portion of the inner periphery of the cavity 55, is urged outwardly against such circumferential portion by the divider-combiner valve 37 and thereby seals the first step 58A of the cavity 55 from the second step 58B. A third 0-ring 67 similarly carried by the divider-combiner valve 37 and similarly circumferentially urged against different portions of the inner periphery of the cavity 55 similarly seals off or isolates the second step 58B from the third step 58C. A fourth O-ring 69 similarly isolates the third step 58C from the fourth step 58D.

The valve body 57 presented in FIGS. 2-6 includes a first or upper passageway 71 which permits communication of hydraulic fluid between the hydraulic fluid source 21 and the first step 58A of the cavity 55. The valve body 57 also includes a second or intermediate passageway 73 which permits similar hydraulic fluid communication between the hydraulic fluid source 21 and the second step 58B of the cavity 55. The valve body 57 further includes a third or lower passageway 75 (presented in FIGS. 2, 5 and 6) which permits communication between the hydraulic fluid source 21 and the third and fourth steps 58C and 58D.

It can be appreciated that the valve body 57 can include a plurality of individual passageways at any of the above-discussed first (or upper), second (or intermediate) or third (or lower) passageways 71, 73 or 75, which respectively permit fluid communication between the hydraulic fluid source 21 and the first, second and third (and fourth) steps 58A, 58B and 58C (and 58D) of the cavity 55.

When the divider-combiner valve 37 functions as a flow divider, the second passageway 83 functions as a fluid input or inlet port for the valve 37, and the first and third passageways 71, 75 function as fluid output or outlet ports. When the valve 37 functions as a flow combiner, inlet and outlet functions of the passageways 71, 73 and 75 are reversed.

The illustrated embodiment of the valve 37 is disposed within the cavity 55 along an axis 77; and a valve housing 79 (Static in relation to the valve body 57) separtes the inner working parts of the valve 37 from the cavity 55. The valve housing 79 includes threads 80 exernally circumferentially cut or otherwise formed along a portion of the outer periphery of the valve housing 79 proximate to the opening or mouth of the cavity 55. A circumferential inner portion of the retainer 63 includes threads mated to threads 80, the retainer 63 being screwed onto the valve housing 79 at the threads 80, the valve housing 79 thereby being held or otherwise urged into the cavity 55 by the retainer 63.

The valve housing 79 provides a generally cylindrical shell, on line with and oriented about the axis 77, enclosing a cylindrical channel 81 through which hydraulic fluid flows and within which two pressure-responsive flow control elements 83, 85 snugly fit. Movement of the first and second flow control elements 83, 85 is permitted generally along the axis 77.

Each flow control element 83, 85 has an inner core portion 87, a plurality of orifices 89, and a plurality of respective ports 91A, 91B. Each respective inner core portion 87 provides each respective flow control element 83, 85 with a cylindrically-shaped inner void oriented substantially about the axis 77. Each orifice 89 forms a cylindrically-shaped void through a portion of the respective flow control elements 83, 85, each orifice 89 being oriented substantially transverse to the axis 77 and permitting fluid communciation between a portion of the channel 81 and the inner core 87. Each orifice 89 has a relatively small diameter, as contrasted against the relatively large diameter of the core portion 87. Each flow control element 83, 85 has a respective plurality of ports 91A, 91B which provide fluid communication between portions of the channel 81 and respective inner portions 87 of the flow control elements 83, 85. Like the orifices 89, each port 91A, 91B forms a cylindrically-shaped void through a portion of the respective flow control element 83, 85, each respective port 91A, 91B being oriented substantially transverse to the axis 77. An individual port 91A, 91B has a greater diameter than an individual orifice 89. In addition, as to the upper or the lower flow control element 83 or 85, the cumulative cross-sectional area of all of the ports 91A or 91B is substantially greater than the cumulative cross sectional area of all of the orifices 89.

As an initially empty valve 37, functioning as a flow divider, is filled with hydraulic fluid, hydraulic fluid enters the cavity 55 via the second or intermediate passageway 73 and flows from the second step 58B (of the cavity 55), through the valve housing 79 via a first opening 93, and into an intermediate portion 95 of the channel 81. Once in the intermediate portion 95, fluid flows through the orifices 89 and into the core portion 87 of each respective flow control element 83, 85. Hydraulic fluid eventually fills each inner core portion 87 and the remainder portions 97, 98 (of the channel 81) and thereafter is caused to flow out of the channel 81 via the ports 91A, 91B, and into the first (or upper) and third (or lower) passageways 71, 75. The first and third passageways 71, 75 are appropriately connected individually to hydraulic motors 43, 45 (FIG. 1), as discussed above.

First and second end caps 99, 101 seal respective ends of the channel 81 thereby isolating the channel 91 from the cavity 55. The upwardly oriented or outwardly extending end cap 99 is not integral with the end portion of the valve housing 79, but, rather, is urged against such end portion of the valve housing 79 by a spacer 103, which itself is biasly engaged and inwardly urged into the cavity 55 by the above-discussed cap or retainer 63.

Nor is the downwardly oriented or inwardly extending end cap 101, located at the other end portion of the valve housing 79, integral with the valve housing 79. Rather, the lower end cap 101 is urged against the opposite end portion of the valve housing 79 by the base 102 of the cavity 55.

Figure 4:
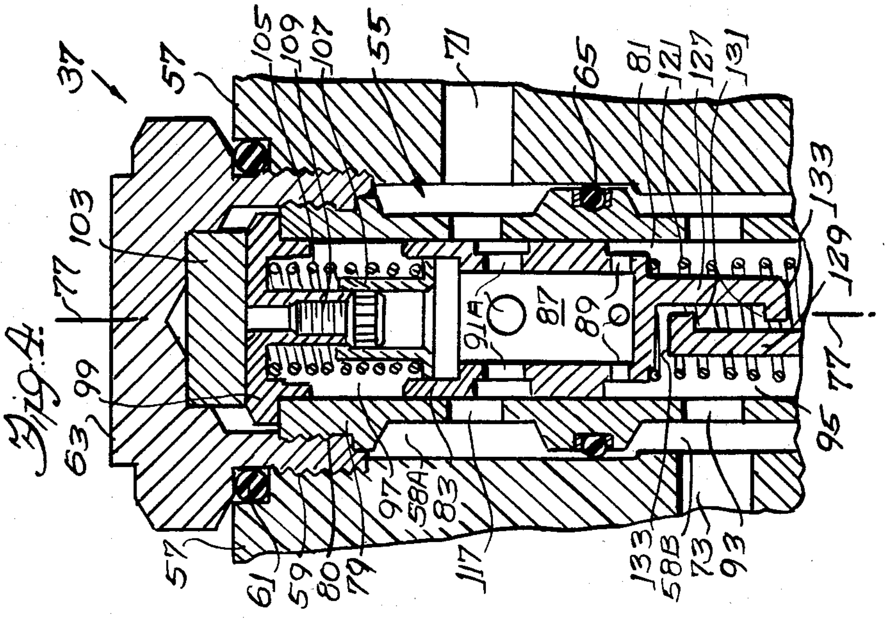
FIG. 4 is also a partial view in section, but presenting downwardly directed axial movement of the flow control element presented in FIG. 3 (within the cavity) and subsequent partial closure of the passageway.
Figure 3:
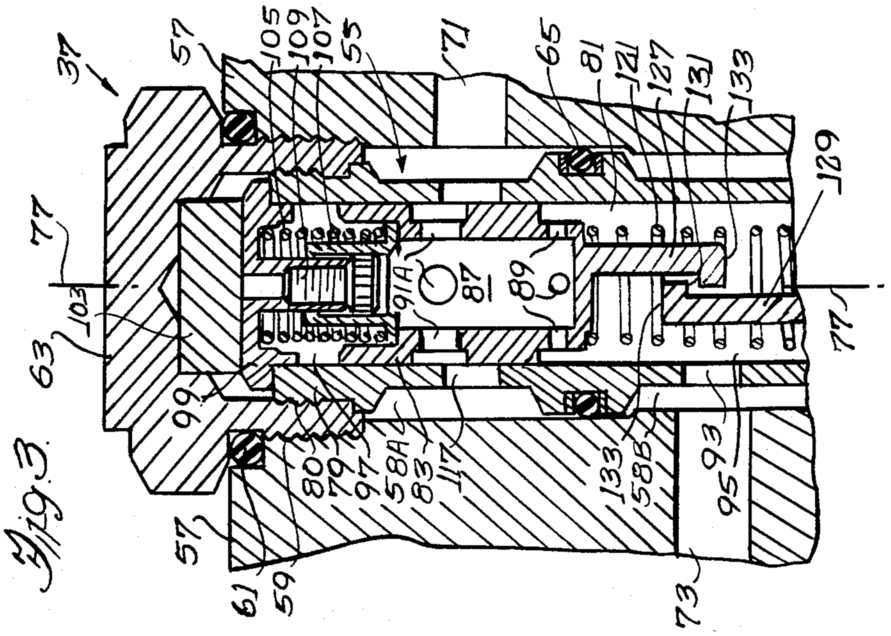
FIG. 3 is a partial view, in section, presenting upwardly directed axial movement of the upper pressure-responsive flow control element within the cavity and subsequent partial closure of one of the passageways.
Figure 5:
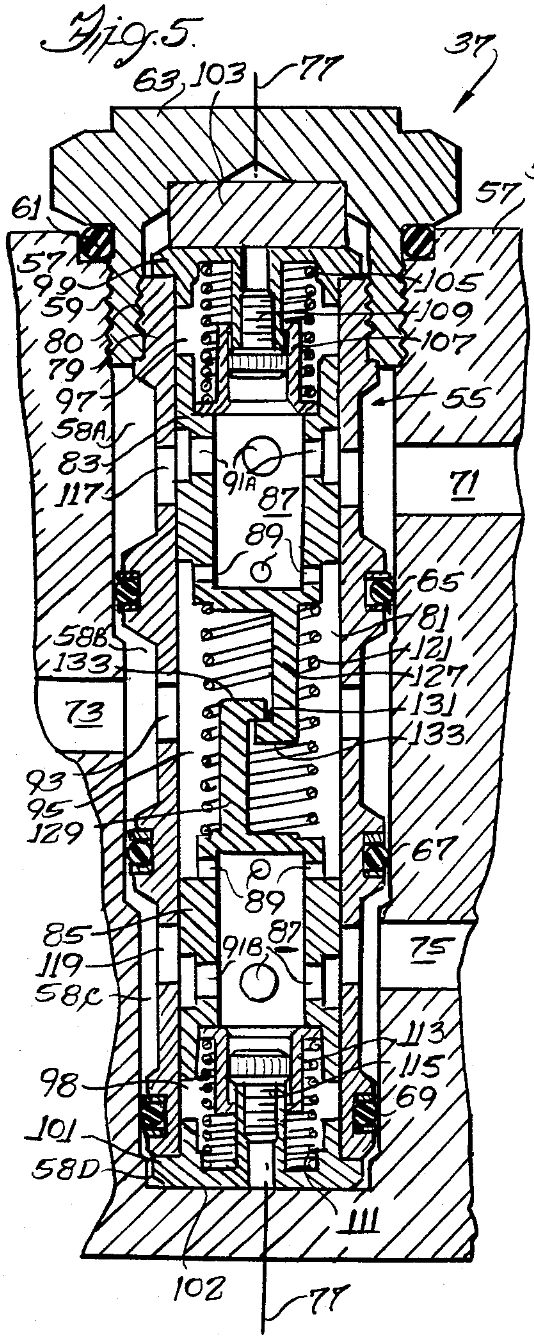
FIG. 5 is a side view, partially in section, presenting one fluid-flow situation wherein the two pressure-responsive flow control elements axially move in unison within the cavity; and, FIG. 6 is a side view, partially in section, presenting another such fluid-flow situation where the two pressure-responsive flow control elements axially move in unison within the cavity.
Figure 6:
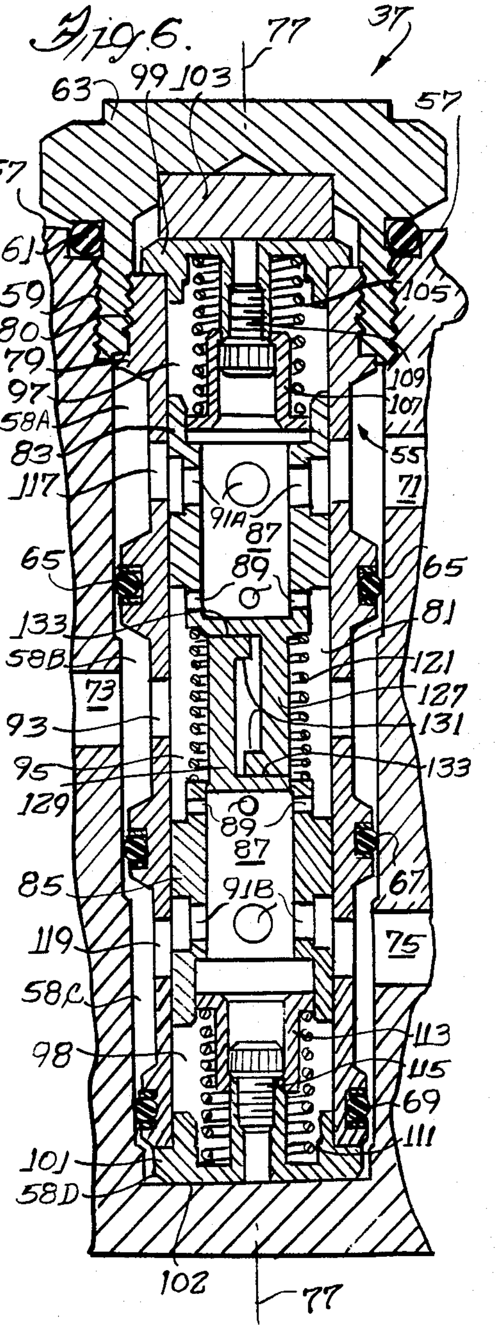

A first or upper spring 105, preloaded to a pressure corresponding to about 50 psi and partially restrained by a first or upper spring guide 107 which is secured by a bolt 109 to the upper end cap 99, is oriented along the axis 77 between the end cap 99 and the first flow control element 83 such that the upper spring 105 urges the upper flow control element 83 away from the end cap 99. Biasing action of the upper spring 105 upon the upper flow control element 83 is restrained, however, when the upper spring guide 107 is restrained by the head of the upper bolt 109 (FIGS. 2, 4 and 6). Such a restraint by the upper spring guide 107 is of a one-way nature and the spring guide 107 is generally free to move axially along the axis 77 compressing the upper spring 105 (FIGS. 3, 5). However, it is the action of the first or upper flow control element 83, acting upon the upper spring guide 107, which compresses the upper spring 105 (FIGS. 3 and 5).

In a similar fashion, a second or lower spring 111, also preloaded to a pressure corresponding to about 50 psi, is partially restrained by a second or lower spring guide 113 which is secured to the lower end cap 101 by a second bolt 115. In a manner somewhat similar to the above discussion, the lower spring 111 generally urges the lower flow control element 85 and the lower end cap 101 apart but is restrained by the lower spring guide 113 engaging the head of the lower bolt 115. Restraint of the lower spring 111 is similar to the one-way kind of restraint discussed above in that as the lower flow control element 85 moves upwardly away from the lower spring guide 113, the lower flow control element 85 eventually becomes free from influence of the lower spring 111 (FIG. 6). However, the compressive action of the lower flow control element 85 upon the lower spring guide 113 compresses the lower spring 111.

Whenever the first spring 105 or the second spring 111 is in such a restrained state (FIG. 2) and while the upper and lower flow control elements 83, 85 respectively touch the upper and lower spring guides 107, 113, the ports 91A and 91B of the first (or upper) and second (or lower) flow control elements 83 and 85 substantially line up respectively with a second and third opening 117 and 119 through the valve housing 79 thereby permitting flow of hydraulic fluid therethrough and fluid communication between respective first and third passageways 71 and 75 and a core portion 87 of respective first and second flow control elements 83, 85.

Prior to the present invention, the first and second springs 105 and 111 had been moderately weak springs. It was not uncommon, in a commercially available divider-combiner flow valve, to preload end springs to a pressure corresponding to about 5 psi. Hydraulic fluid pressures generally encountered in passageways 71 and 75 can easily cause the flow control elements 83 or 85 to compress such a spring and to restrict, sometimes adversely, flow through such passageways 71 or 75.

In addition, the present invention incorporates spring guides 107 and 113 to restrain the end springs 105 and 111 and, more importantly, to maintain a substantially unrestricted flow condition permitting hydraulic fluid to generally freely flow through the passageways 71 and 75. Thus, it is the cooperation between the springs 105, 111 and respective spring guides 107, 113 which permits fluid flow through passageways 71, 75 to be relatively insensitive to operating upsets which otherwise result in fluid pressure changes and resultant changes in flows of hydraulic fluid occurring within the passageways 71, 75.

A third or intermediate spring 121, preloaded to a pressure corresponding to about 25 psi, is oriented along the axis 77 such that the first flow control element 83 is biased away from the second flow control element 85.

When the valve 37 functions as a flow divider, it can be appreciated that the orifices 89 effect a pressure drop for the hydraulic fluid flowing from the intermediate portion 95 (of the channel 81) into the hollow inner cores 87 of the respective flow control elements 83, 85. Referring to the first or upper pressure-responsive flow control element 83 (FIG. 2), it will be appreciated that such a pressure drop exists because the orifices 89 offer much more resistance to flow than do the ports 91A. Because the orifices 89 offer such a resistance to flow, a first pressure differential exists between a first pressure-responsive surface 123 and a second pressure-responsive surface 125 of the first flow control element 83.

The orifices 89 and ports 91B (of the second flow control element 85) are similarly responsible for a second pressure differential acting upon the second flow control element 85.

When the valve 37 functions as a flow divider, it will be appreciated that as fluid pressure in the intermediate portion 95 of the channel 81 causes the sum of the first and the second pressure differentials to exceed 25 psi, the upper and the lower springs 105, 111 become compressed by the respective flow control elements 83, 85. As the first flow control element 83 compresses the first spring 105, the ports 91A of the first flow control element 83 move in relation to the (corresponding) second opening 117 (FIG. 3) and flow therethrough becomes restricted (to a slight degree). Likewise, compression of the second or lower spring 111 by the second or lower flow control element 85 similarly moves the ports 91B (of the second flow control element 85) in relation to the (corresponding) third opening 119 similarly resulting in slight restriction of hydraulic fluid therethrough.

The first and the second flow control elements 83, 85 each include a respective L-shaped tail 127, 129 structurally integral therewith and extending outwardly therefrom in the direction of the other flow control element 83, 85. The L-shaped end or tail 127 of the upper flow control element 83 and the L-shaped tail 129 of the lower flow control element 85 are axially inserted into opposite ends of the intermediate spring 121, are adapted to interfit therein, and are further adapted to engage at end portions 131 of the L-shaped tails 127, 129 so that the first and second flow control elements 83, 85 move in unison (FIG. 5) when fluid pressure in the intermediate portion 95 (of the cavity 55) is sufficient to compress the end springs 105, 111 and cause the end portions 131 of opposing tails 127, 129 to touch. And when fluid pressure within the upper passageway 71 or the lower passageway 75 or both such passageways 71, 75 (FIG. 6) is sufficiently greater than the pressure exerted by the intermediate spring 121, the intermediate spring 121 becomes compressed and the L-shaped tail 127, 129 of one flow control element 83, 85 butts against the other flow control element at ends 133; and both flow control elements 83, 85 move in unison (FIG. 6) within the channel 81.

When the divider-combiner valve 37 is functioning as a flow divider and the first or upper passageway 71 is supplying a hydraulic motor 43 or 45 which is under little or no load (as would be the case when such a hydraulic motor 43 or 45 drives a wheel on ice), the no-load hydraulic motor 43 or 45 offers very little resistance to flow of hydraulic fluid and hydraulic fluid pressure resultingly drops in the first passageway 71. Hydraulic fluid pressure in the inner core 87 of the first or upper flow control element 83 accordingly drops, which results in an increase in the (first) pressure differential (between the first and the second pressure-responsive surfaces 123 and 125) of the first or upper flow control element 83. Whereupon, the first flow control element 83 moves upwardly in the cavity 81, usually compressing the upper spring 105 (FIG. 3). However, because the upper spring 105 is relatively insensitive to most pressures normally experienced within the upper passageway 71, the upper spring 105 is not substantially compressed and flow through the first or upper passageway 71 is not entirely cut off (FIG. 3); and if the flow control elements 83, 85 are acting in unison (FIG. 5), fluid flow through the lower fluid passageway 75 is not greatly affected.

When flow of hydraulic fluid is reversed through the divider-combiner valve 37, the present invention presents substantially the same advantages as to flow of hydraulic fluid through the passageways 71 and 75. The flow control elements 83, 85 of the valve 37 are generally responsive to fluid pressure in the first (or upper) and third (or lower) fluid passageways 71, 75, and are adapted to generally adjust flow of hydraulic fluid accordingly. However, the various elements of the novel divider-combiner valve 37 of the invention act or operate co-operatively to prevent total cut-off or restriction of hydraulic fluid through the passageways 71, 75 when the valve 37 is responding to operating upsets.

Accordingly, the present invention is relatively insensitive to system upsets such as would normally be experienced when the wheeled vehicle (discussed above) is on ice or is rounding a corner. Incorporation of the valve 37 of the present invention within such a wheeled vehicle has substantially eliminated the wheel lock-up problem discussed above and has signficantly reduced the wheel-dragging problem (addressed above) experienced when the wheeled vehicle negotiates a curve.

The flow control elements 83, 85 of the divider-combiner valve 37 of the present invention normally act independently at the start of operation, eventually act in unison (FIGS. 5, 6), normally initially act independently when a system upset arises and eventually again act in unison sometime thereafter.

What has been illustrated and described herein is a novel flow divider-combiner valve unit. While the divider-combiner valve unit of the present invention has been illustrated and described with reference to a preferred embodiment, the invention is not limited thereto. On the contrary, alternatives, changes or modifications may become apparent to those skilled in the art upon reading the foregoing description. Accordingly, such alternatives, changes or modifications are to be considered as forming a part of the invention insofar as they fall within the spirit and scope of the appended claims.

I claim:

1. A flow divider-combiner valve unit comprising: a cavity having first and second spaced portions and a cavity portion intermediate said first and second cavity portions; first and second passageways communicating with said first and second cavity portions and a third passageway communicating with said intermediate cavity portion of; first and second pressure-responsive elements individually movable in said cavity respectively between open positions and progressively closed positions thereby for controlling fluid flow between said first and second cavity portions and said first and second passageways, said first and second elements respectively including fourth and fifth passageways providing communication between said first and second passageways and said cavity, said fourth passageway being alignable with one of said first and second passageways and said fifth passageway being alignable with the other of said first and second passageways for thereby providing said open positions for enabling substantially unrestricted flow individually through said one and through said other of said first and second passageways; means disposed within said cavity and cooperatively engagable with said first and second elements in a first predetermined inner position fixed against further movement inwardly of the cavity for individually retaining said first and second elements substantially in said open positions until there is at least a predetermined substantial pressure difference between fluid pressures in said first and said second cavity portions and said intermediate cavity portion and; means disposed within said cavity and coactable with said retaining means permitting movement of said retaining means from the said inner position outwardly of the cavity under influence of the adjacent pressure-responsive element for enabling said first and second elements to move substantially independently of each other toward said respective closed positions when a predetermined pressure differential between said intermediate cavity portion and one of said first and second cavity portions exceeds said predetermined pressure difference and for causing said first and second elements to move substantially in unison when the pressure differential between said intermediate cavity portion and both of said first and second cavity portions exceeds said predetermined pressure difference, said retaining means including helical spring means acting against one end of a sleeve member selectively engaging and disengaging the adjacent pressure-responsive element, and a fixed abutment member interiorly telescopingly cooperating with the opposite end of the sleeve member for limiting movement thereof beyond the said predetermined inner position thereof.

2. The valve unit of claim 1 wherein said spring means include at least one helical spring preloaded to about 50 psi pressure.

3. The valve unit of claim 1 wherein said enabling and causing means comprises: first hook means integral with one of said first and second elements and second hook means integral with said other of said first and second elements, said second hook means being disposed toward said one of said first and second elements and engageable with said first hook means and said one of said first and second elements, for enabling said first and second elements to engage and thereby move substantially in unison; and spring means disposed intermediate and engaging said first and second elements for urging said first and second elements apart.

4. The valve unit of claim 3 wherein said spring means includes a helical spring preloaded to about 25 psi pressure and disposed about said first and second hook means.

5. The valve unit of claim 1 wherein the abutment member comprises a bolt fixed to the adjacent end of the cavity wall.

6. The valve unit of claim 5 wherein the bolt and sleeve member are substantially encompassed by the helical spring leaving the said one end of the sleeve member free for selective cooperation with the adjacent pressure-responsive element.

* * * * *